(12) United States Patent
Gehring et al.

(10) Patent No.: US 6,739,968 B1
(45) Date of Patent: May 25, 2004

(54) INTERCHANGEABLE AIR VENT ASSEMBLY AND VEHICLES INCORPORATING SAME

(75) Inventors: Thomas F. J. Gehring, Ontario (CA); Ireneusz Jankowski, Ontario (CA); Dejan Havidic, Toronto (CA)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 10/434,862

(22) Filed: May 9, 2003

Related U.S. Application Data

(60) Provisional application No. 60/424,994, filed on Nov. 8, 2002.

(51) Int. Cl.[7] ................................................. B60H 1/34
(52) U.S. Cl. ..................... 454/152; 454/143; 454/155
(58) Field of Search ................................ 454/143, 155, 454/152, 316

(56) References Cited

U.S. PATENT DOCUMENTS

| | | | |
|---|---|---|---|
| 4,006,673 A | 2/1977 | Meyer et al. ............... | 98/40 |
| 4,345,510 A | 8/1982 | Sterett ....................... | 98/40 |
| 4,702,156 A | 10/1987 | Sano ........................ | 98/40.24 |
| 5,338,252 A | 8/1994 | Bowler et al. ............. | 454/155 |
| 5,569,076 A | 10/1996 | Sudak et al. .............. | 454/155 |
| 5,690,550 A | 11/1997 | Mikowski .................. | 454/155 |
| 5,741,179 A | 4/1998 | Sun et al. .................. | 454/155 |
| 5,746,651 A | 5/1998 | Arajs et al. ................ | 454/154 |
| 5,752,877 A | 5/1998 | Sun .......................... | 454/155 |
| 5,947,813 A | 9/1999 | Chow et al. ............... | 454/155 |
| 6,059,653 A | 5/2000 | Gehring et al. ........... | 454/155 |
| 6,126,539 A | * 10/2000 | Miller et al. .............. | 454/144 |
| 6,129,627 A | 10/2000 | Jankowski et al. ........ | 454/155 |
| 6,494,780 B1 | * 12/2002 | Norbury, Jr. .............. | 454/319 |

* cited by examiner

*Primary Examiner*—Derek S. Boles
(74) *Attorney, Agent, or Firm*—Myers Bigel Sibley & Sajovec

(57) ABSTRACT

Air vent assemblies for vehicles that facilitate interchangeability of air vents and other components include an air duct manifold, a trim plate, and a plurality of interchangeable air vents. An air duct manifold includes a plurality of air ducts, with each air duct terminating at a respective outlet. A trim plate includes opposite front and rear walls, with a plurality of nozzles extending from the rear wall in spaced-apart relationship. Each nozzle detachably engages a respective air duct outlet and is configured to receive air from the air duct and allow the air to pass therethrough and out of a respective opening in the trim plate front wall. Each air vent is detachably secured within a respective opening in the trim plate front wall and may be easily detached for repair or replacement.

10 Claims, 5 Drawing Sheets

INTERCHANGEABLE AIR VENT ASSEMBLY AND VEHICLES INCORPORATING SAME

RELATED APPLICATION

This application claims the benefit of U.S. Provisional Application No. 60/424,994, filed Nov. 8, 2002, the disclosure of which is incorporated herein by reference in its entirety as if set forth fully herein.

FIELD OF THE INVENTION

The present invention relates generally to vehicles and, more particularly, to air vent systems utilized within vehicles.

BACKGROUND OF THE INVENTION

Conventionally, passenger compartments of vehicles are provided with one or more air vents which are connected by ducts to a heating and/or air conditioning system that provides conditioned air. Because it is generally desirable for vehicle occupants to be able to adjust the direction and/or amount of air flow within a passenger compartment, vents may be provided with adjustable louvers. In addition, vents may be provided with dampers for allowing vehicle occupants to control the amount of air flowing therethrough. Various types and styles of air vents are described in U.S. Pat. Nos.: 4,345,510; 4,702,156; 4,006,673; 5,338,252; 5,569,076; 5,746,651; 5,752,877; 5,741,179; 5,690,550; 5,947,813; 6,129,627; and 6,059,653.

Vehicle manufacturers are continuously seeking ways to reduce costs associated with vehicle manufacturing. In addition, vehicle manufacturers are continuously seeking was to simplify the design of air vents and to reduce the expense of air outlet assemblies.

SUMMARY OF THE INVENTION

In view of the above discussion, air vent assemblies for vehicles are provided that facilitate interchangeability of air vents and other components. According to embodiments of the present invention, an air vent assembly includes an air duct manifold having a plurality of air ducts. Each air duct terminates at a respective outlet and the air duct manifold is configured to receive air from an air source and to allow the air to flow therethrough and exit from each outlet. The air vent assembly further includes a trim plate having opposite front and rear walls. A plurality of nozzles extend from the trim plate rear wall in spaced-apart relationship, and each nozzle defines an air passageway that terminates at a respective opening in the trim plate front wall. Each nozzle detachably engages a respective air duct outlet and is configured to receive air from the air duct and allow the air to pass therethrough and out of a respective opening in the trim plate front wall. Each nozzle may be detached from a respective air duct outlet such that the trim plate may be easily removed for repair or replacement, and each opening is configured to detachably receive any of a plurality of different air vents therewithin. The air vent assembly also includes a plurality of air vents. Each air vent is detachably secured within a respective opening in the trim plate front wall, and each air vent may be easily detached from a respective opening for repair or replacement.

BRIEF DESCRIPTION OF THE DRAWINGS

The accompanying drawings, which form a part of the specification, illustrate key embodiments of the present invention. The drawings and description together serve to fully explain the invention.

DETAILED DESCRIPTION OF THE INVENTION

Figure 1:
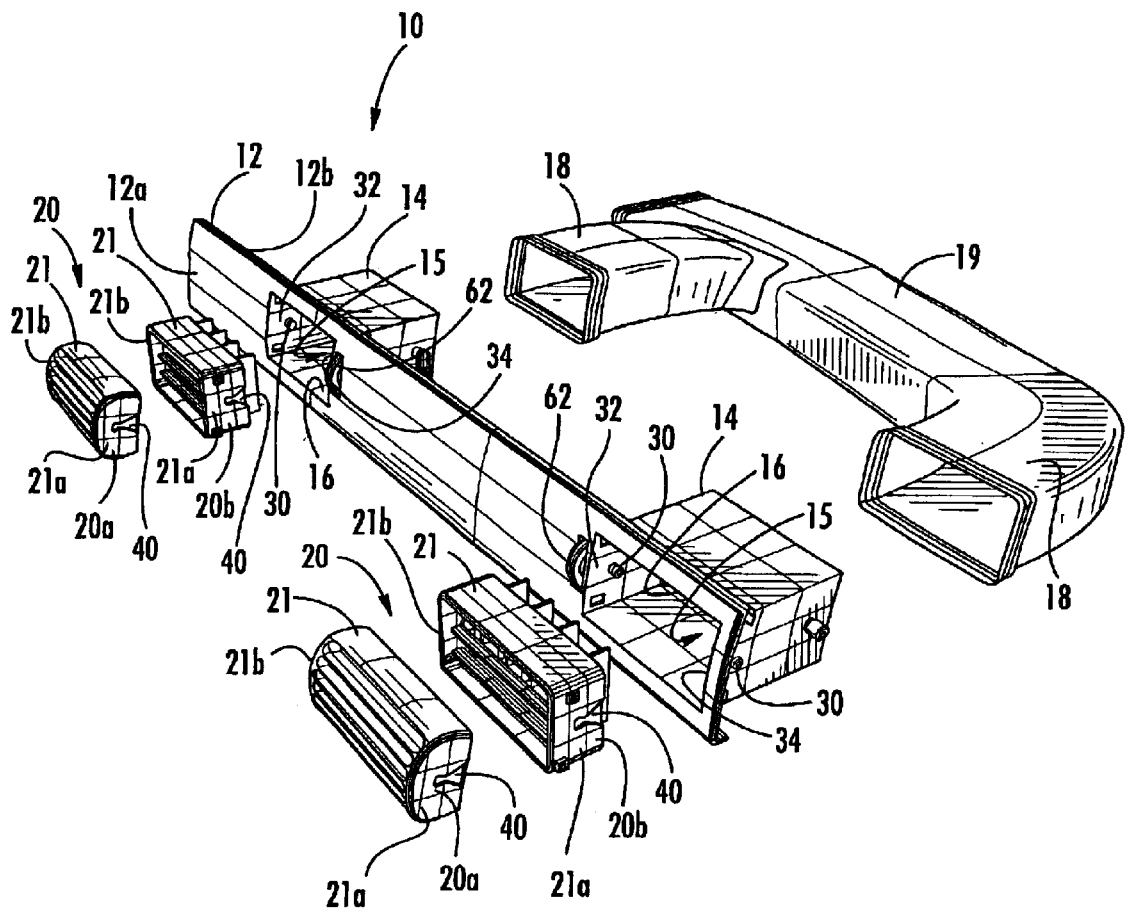
FIG. 1 is an exploded perspective view of an interchangeable air vent system, according to embodiments of the present invention.

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the drawings, the thickness of lines, layers and regions may be exaggerated for clarity. It will be understood that when an element such as a layer, region, substrate, or panel is referred to as being "on" another element, it can be directly on the other element or intervening elements may also be present. In contrast, when an element is referred to as being "directly on" another element, there are no intervening elements present. It will be understood that when an element is referred to as being "connected" or "attached" to another element, it can be directly connected or attached to the other element or intervening elements may also be present. In contrast, when an element is referred to as being "directly connected" or "directly attached" to another element, there are no intervening elements present. The terms "upwardly", "downwardly", "vertical", "horizontal" and the like are used herein for the purpose of explanation only.

Referring to FIG. 1, an interchangeable air vent assembly 10, according to embodiments of the present invention, is illustrated. The illustrated interchangeable air vent assembly 10 is designed for use within the passenger compartments of various types of vehicles, including automobiles, trucks, trains, airplanes, etc. Interchangeable air vent assemblies according to embodiments of the present invention may be utilized in various environments and are not limited to use in passenger vehicles.

The illustrated interchangeable air vent assembly 10 includes an elongated trim plate (also known as a "trim bezel") 12 having opposite front and rear walls 12a, 12b, that is configured to be mounted to various types of passenger compartment panels within a vehicle including, but not limited to, instrument panels, center consoles, head liners, pillars, seating structures, etc. A pair of nozzles 14 extend outwardly from the trim plate rear wall 12b in spaced-apart relationship, as illustrated. Each nozzle 14 defines an air passageway 15 that terminates at a respective opening 16 in the trim plate front wall 12a. Each nozzle 14 is configured to detachably engage and communicate with a respective air duct outlet 18 extending from an air duct manifold 19, and receive air therefrom.

The air duct manifold 19 is configured to be connected to a source of air flow, such as a fan, that forces air (e.g., heated and/or cooled air) through the air duct manifold 19 and through each air duct outlet 18. Air duct manifolds and sources of air for vehicle passenger compartments are well understood by those skilled in the art and need not be discussed further herein. Each nozzle 14 detachably engages a respective air duct outlet 18 and is configured to receive air therefrom. By allowing each nozzle 14 to be detachable from a respective air duct outlet 18, the trim plate may be easily removed from the air duct manifold 19 for repair or replacement.

Each opening 16 in the trim panel front wall 12a is configured to detachably and interchangeably receive any of a plurality of different types of air vents 20 therewithin, including barrel-type vents 20a, louver-type vents 20b, oscillating-type vents (see, U.S. Pat. No. 5,569,076), popup-type vents (see U.S. Pat. No. 5,752,877), etc. Vents that may be used in accordance with embodiments of the present invention include, but are not limited to, vents described in the following U.S. Pat., Nos. each of which is incorporated by reference in its entirety: 4,345,510; 4,702,156; 4,006,673; 5,338,252; 5,569,076; 5,746,651; 5,752,877; 5,741,179; 5,690,550; 5,947,813; 6,129,627; and 6,059,653. Vent interchangeability allows a vehicle manufacturer to install different types of air vents within vehicle models easily and inexpensively. Moreover, the trim plate 12 can be easily changed to provide various aesthetic appearances and/or features.

Figure 2A:
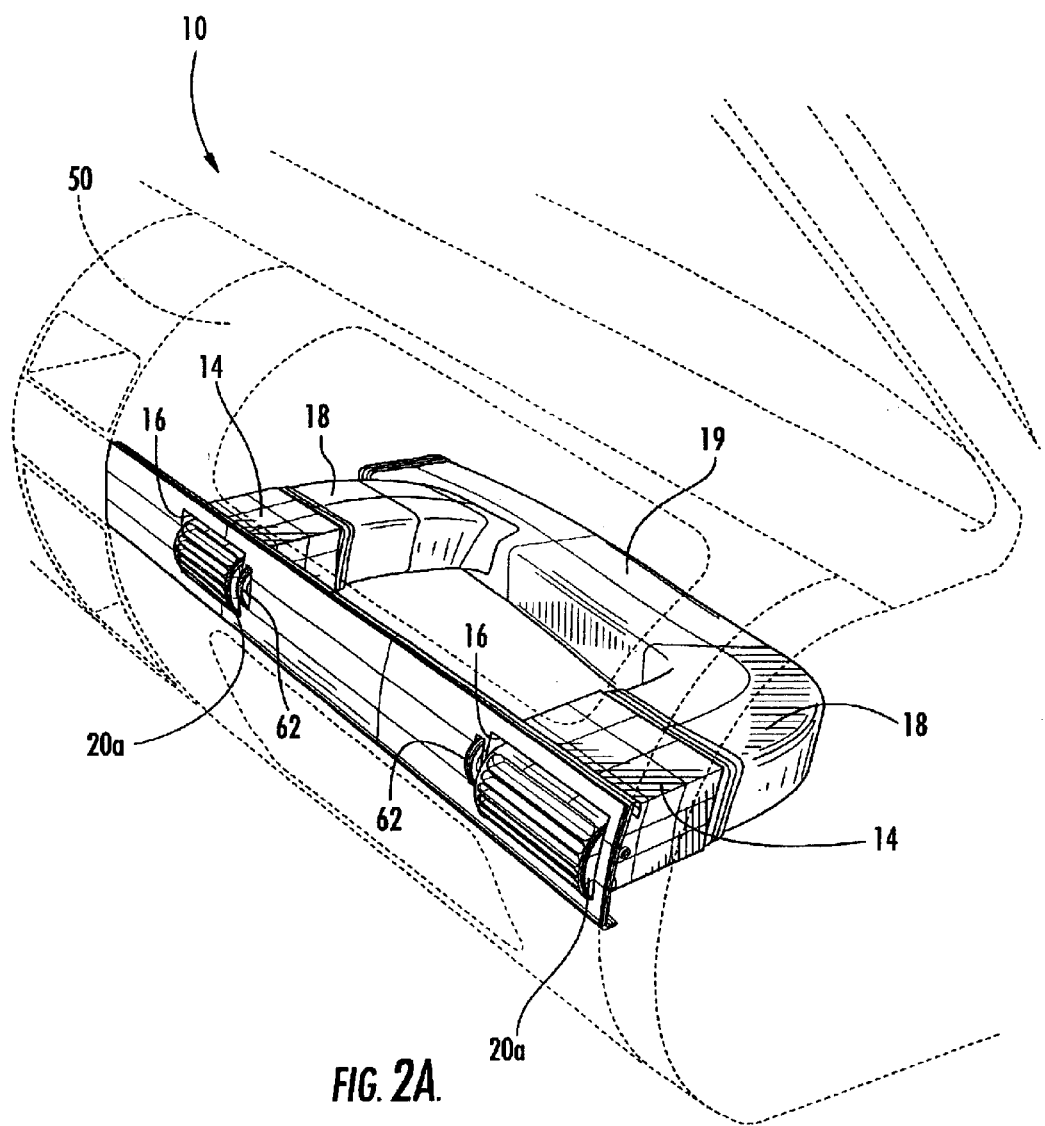
FIG. 2A illustrates the air vent system of FIG. 1 in an installed configuration in a passenger compartment and including barrel-type vents.

Referring to FIG. 2A, the interchangeable air vent system 10 of FIG. 1 is illustrated in an installed configuration within a vehicle passenger compartment. The trim plate 12 is attached to an instrument panel 50 and the nozzles 14 extend therethrough and are detachably secured to the air duct outlets 18 extending from the air. duct manifold 19. Barrel-type vents 20a are detachably secured within the openings 16 of the trim plate 12.

Figure 2B:
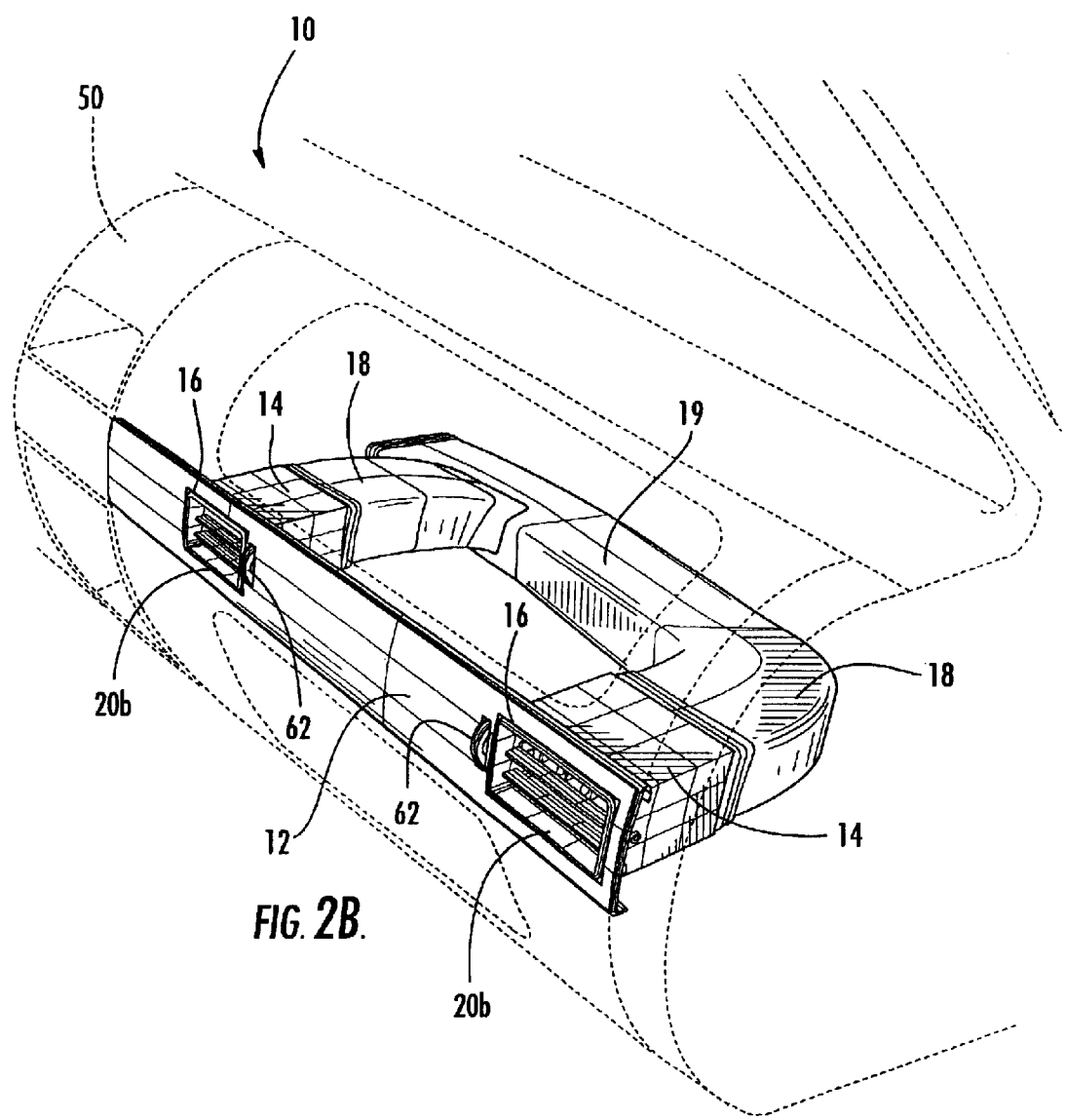
FIG. 2B illustrates the air vent system of FIG. 1 in an installed configuration in a passenger compartment and including louver-type vents.

Referring to FIG. 2B, the interchangeable air vent system 10 of FIG. 1 is illustrated in an installed. configuration within a vehicle passenger compartment. The trim plate 12 is attached to an instrument panel 50 and the nozzles 14 extend therethrough and are detachably secured to the air duct outlets 18 extending from the air: duct manifold 19. Louver-type vents 20b are detachably secured within the openings 16 of the trim plate 12.

Referring back to FIG. 1, each air vent 20 is configured to be pivotally mounted within a respective air passageway 15. Each illustrated air passageway 15 is defined by opposite walls 32, 34. A pair of posts or trunnions 30 extend outwardly from opposing walls 32, 34 and are configured to engage respective slots 40 in a respective air vent 20. In the illustrated embodiment, the trunnions 30 are adjacent each respective opening 16 in the trim plate 12. Each air vent 20 has a housing 21 that includes opposite end portions 21a, 21b. A slot 40 is formed in each end portion 21a, 21b and is configured to detachably receive a respective one of the trunnions 30 therein such that each air vent is detachably and pivotally secured within a respective opening 16. In the illustrated embodiment, each vent 20 can pivot about the trunnions 30 within each air passageway 15 so as to direct the flow of air therethrough.

Figure 3:
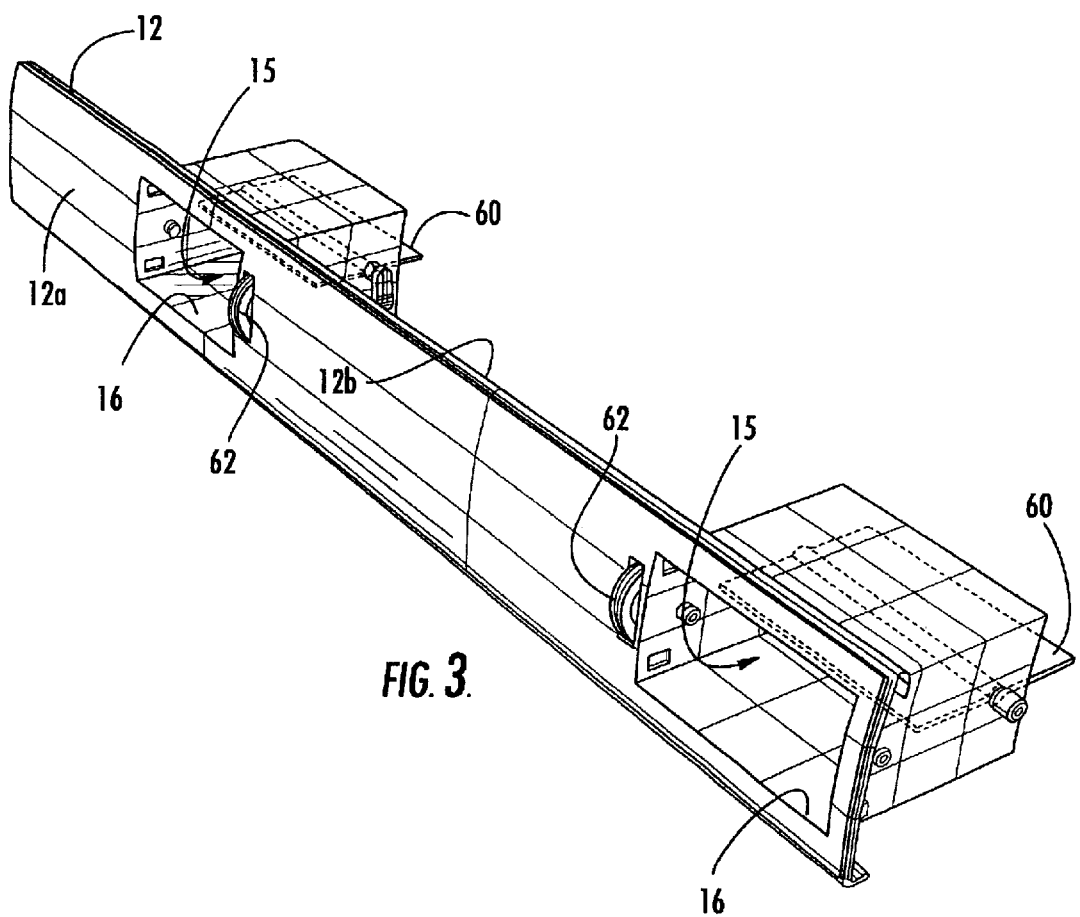
FIG. 3 is a perspective view of the trim plate of FIG. 1 illustrating a damper within each one of the nozzle passageways.
Figure 4A:
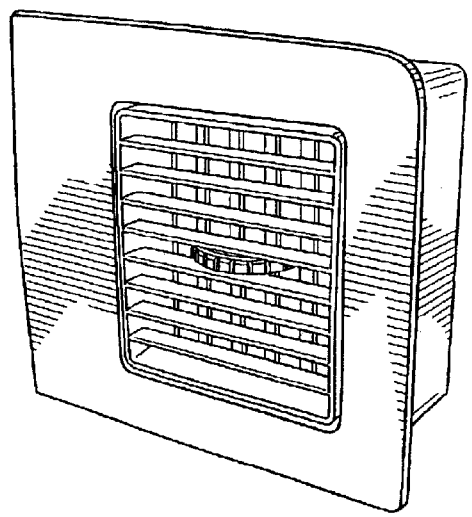
FIGS. 4A–4D are perspective views of exemplary types of interchangeable air vents that may be utilized with the air vent system of the present invention.
Figure 4B:
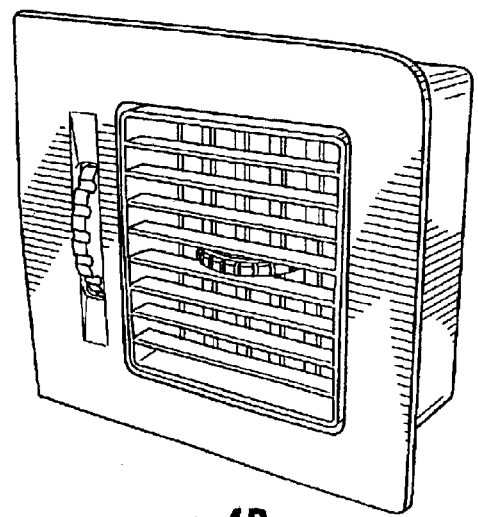
Figure 4C:
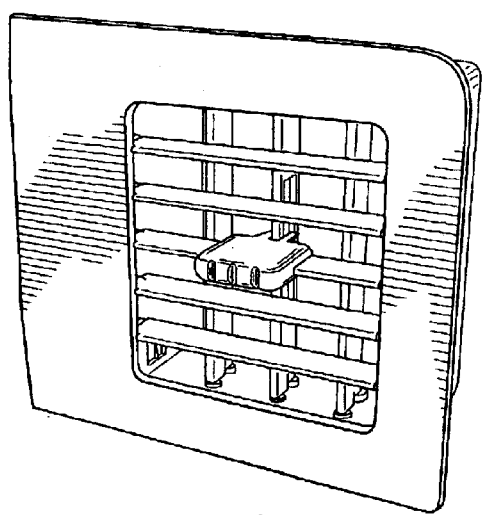
Figure 4D:
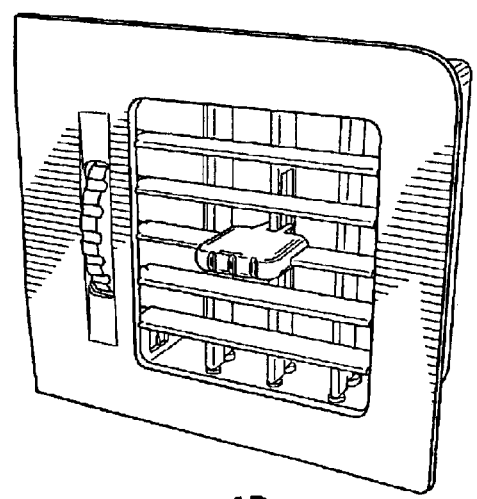

Referring to FIG. 3, each air passageway 15 includes a damper 60 disposed therewithin that is user-controllable for controlling an amount of air flowing through the air passageway 15. A user control 62 is. operably connected with the damper and extends from the trim plate front wall 12a adjacent each respective air vent opening 16. In the illustrated embodiment, the user control 62 is a thumb wheel. However, various types of user controls may be:utilized.

FIGS. 4A–4D are perspective views of various types of air vents that may be interchangeably utilized in accordance with embodiments of the present invention.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. The invention is defined by the following claims, with equivalents of the claims to be included therein.

That which is claimed is:

1. An interchangeable air vent assembly for a vehicle, comprising:
   an air duct manifold comprising a plurality of air ducts, each air duct terminating at a respective outlet, wherein the air duct manifold is configured to receive air from an air source and allow the air to flow therethrough and exit from each outlet;
   a trim plate comprising:
      opposite front and rear walls; and
      a plurality of nozzles extending from the trim plate rear wall in spaced-apart relationship, wherein each nozzle defines an air passageway that terminates at a respective opening in the trim plate front wall, wherein each nozzle detachably engages a respective air duct outlet and is configured to receive air from the air duct and allow the air to pass therethrough and out of a respective opening, wherein each nozzle may be detached from a respective air duct outlet such that the trim plate may be easily removed for repair or replacement, and wherein each opening is configured to detachably receive any of a plurality of different air vents therewithin; and
   a plurality of air vents, each air vent detachably secured within a respective opening in the trim plate, wherein each air vent may be easily detached from a respective opening for repair or replacement.

2. The air vent assembly of claim 1, wherein each nozzle comprises a damper operably associated therewith, and wherein the damper is user-controllable for controlling an amount of air flowing through the nozzle.

3. The air vent assembly of claim 1, wherein a respective user control is operably connected with each damper and extends from the trim plate front wall adjacent each respective air vent.

4. The air vent assembly of claim 1, wherein each nozzle comprises opposite walls, wherein a post extends from each wall adjacent a respective opening in the trim plate, wherein each air vent comprises a housing having opposite end portions, and wherein each end portion includes a slot configured to detachably receive a respective one of the posts therein such that each air vent is detachably secured within a respective opening.

5. The air vent assembly of claim 1, wherein the air vents are selected from the group consisting of barrel-type vents, louver-type vents, oscillating-type vents and popup-type vents.

6. A vehicle, comprising:
   a passenger compartment, comprising an interior panel; and
   an interchangeable air vent assembly, comprising:

an air duct manifold comprising a plurality of air ducts, each air duct terminating at a respective outlet, wherein the air duct manifold is configured to receive air from an air source and allow the air to flow therethrough and exit from each outlet;

a trim plate attached to the interior panel so as to be accessible to a passenger, wherein the trim panel comprises:

opposite front and rear walls; and a plurality of nozzles extending from the trim plate rear wall in spaced-apart relationship, wherein each nozzle defines an air passageway that terminates at a respective opening in the trim plate front wall, wherein each nozzle detachably engages a respective air duct outlet and is configured to receive air from the air duct and allow the air to pass therethrough and out of a respective opening, wherein each nozzle may be detached from a respective air duct outlet such that the trim plate may be easily removed for repair or replacement, and wherein each opening is configured to detachably receive any of a plurality of different air vents therewithin; and a plurality of air vents, each air vent detachably secured within a respective opening in the trim plate, wherein each air vent may be easily detached from a respective opening for repair or replacement.

7. The vehicle of claim 6, wherein each nozzle comprises a damper operably associated therewith, and wherein the damper is user-controllable for controlling an amount of air flowing through the nozzle.

8. The vehicle of claim 6, wherein a respective user control is operably connected with each damper and extends from the trim plate front wall adjacent each respective air vent.

9. The vehicle of claim 6, wherein each nozzle comprises opposite walls, wherein a post extends from each wall adjacent a respective opening in the trim plate, wherein each air vent comprises a housing having opposite end portions, and wherein each end portion includes a slot configured to detachably receive a respective one of the posts therein such that each air vent is detachably secured within a respective opening.

10. The vehicle of claim 6, wherein the air vents are selected from the group consisting of barrel-type vents, louver-type vents, oscillating-type vents and popup-type vents.

* * * * *